United States Patent
Han et al.

(10) Patent No.: US 7,102,695 B2
(45) Date of Patent: Sep. 5, 2006

(54) ADAPTIVE CONTRAST AND BRIGHTNESS ENHANCEMENT WITH COLOR PRESERVATION

(75) Inventors: Yong-In Han, Seongnam (KR);
Chang-Yeong Kim, Yongin (KR);
Seong-Deok Lee, Yongin (KR);
Chang-Won Huh, Suwon (KR);
Seok-Joon Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 10/440,679

(22) Filed: May 19, 2003

(65) Prior Publication Data

US 2004/0036704 A1  Feb. 26, 2004

(30) Foreign Application Priority Data

Aug. 23, 2002 (KR) ...................... 10-2002-0050071

(51) Int. Cl.
*H04N 5/52* (2006.01)
*H04N 5/57* (2006.01)
*H04N 9/64* (2006.01)
*G09G 5/00* (2006.01)
*G09G 5/02* (2006.01)
*G09G 5/10* (2006.01)

(52) U.S. Cl. .................. 348/673; 348/649; 348/678; 348/687; 348/703; 345/589; 345/604; 345/617; 345/690

(58) Field of Classification Search ........ 348/671–673, 348/649, 659, 678, 687, 703; 345/589, 604, 345/617, 690; H04N 5/52, 5/57, 9/64; G09G 5/00, G09G 5/02, 5/10
See application file for complete search history.

(56) References Cited

U.S. PATENT DOCUMENTS 5,874,988 A * 2/1999 Gu .............................. 348/97
6,078,361 A * 6/2000 Reddy ......................... 348/558
6,335,761 B1 * 1/2002 Glen et al. ................... 348/557
6,392,713 B1 * 5/2002 Acker .......................... 348/651
6,441,857 B1 * 8/2002 Wicker et al. ............... 348/441
6,552,731 B1 * 4/2003 Gonsalves ................... 345/589
6,573,905 B1 * 6/2003 MacInnis et al. ........... 345/629
6,664,973 B1 * 12/2003 Iwamoto et al. ............ 345/589

(Continued)

FOREIGN PATENT DOCUMENTS

EP  0 963 111 A1  12/1998

*Primary Examiner*—Brian P. Yenke
(74) *Attorney, Agent, or Firm*—F. Chau & Associates, LLC

(57) ABSTRACT

A method and apparatus for selectively enhancing contrast depending on the level of incoming video signals while preserving colors are provided. An apparatus for enhancing the contrast and brightness of a video signal displayed on a display device includes: a first luminance level transformation circuit that receives luminance and chrominance signals, reduces the level of the luminance signal in response to a first control signal, and outputs the chrominance signals and the luminance signal whose level has been reduced; an image converting circuit that receives the output signals from the first luminance level transformation circuit and converts the received signals into RGB video signals; and a second luminance level transformation circuit that receives the RGB video signals from the image converting circuit, concurrently increases the respective levels of the RGB video signals in response to a second control signal, and outputs the RGB video signals whose levels have been increased. It is desirable that the display device is a color display tube ("CDT"), a thin film transistor liquid crystal display ("TFT-LCD"), or a plasma display panel ("PDP").

18 Claims, 5 Drawing Sheets

U.S. PATENT DOCUMENTS 6,724,435 B1 *   4/2004   Segman .................. 348/576
6,888,553 B1 *   5/2005   Kim et al. .............. 345/589
2003/0122845 A1 *   7/2003   Lee et al. .............. 345/589
2004/0021671 A1 *   2/2004   Leyvi .................... 345/589

* cited by examiner

ADAPTIVE CONTRAST AND BRIGHTNESS ENHANCEMENT WITH COLOR PRESERVATION

BACKGROUND OF THE INVENTION

1. Field of the Invention

The present invention relates to video image signal processing, and more particularly, to an adaptive contrast and brightness enhancement method and apparatus for preserving colors of an image being displayed on a display device.

2. Description of the Related Art

It is known in video image processing that in an environment where the dynamic ranges of video images output to a display device are restricted, the levels of incoming video images are controlled or transformed by a non-linear function to enhance the contrast of these video images. In this case, the non-linear function is already fixed, or made variable based on the histogram of input video images.

Where the levels of incoming video images are simply transformed by the non-linear function, an undesirable white element is generated and saturation is reduced. The contrast at a specific level of the video images within a limited range may improve, but, to improve contrast while maintaining color hues, an approach to adjusting gain depending on the brightness direction components of RGB vectors of incoming video images has been proposed. This approach involves increasing the expansion gain of a signal, which is close to an achromatic color due to its large brightness direction component while decreasing the expansion gain of a signal having a high saturation and a large color-difference component.

This technique makes it possible to increase the overall brightness while maintaining the saturation of colors. However, it has a drawback in that adjusting gain only according to the colors of an image makes selective expansion depending on the luminance level of a video image impossible and saturation occurs due to expansion of the dynamic range.

A need therefore exists for a system and method for selectively increasing contrast depending on the level of an incoming video signal while preserving color.

SUMMARY OF THE INVENTION

According to an aspect of the present invention, there is provided an apparatus for enhancing the contrast and brightness of a video signal displayed on a display device. The apparatus includes a first luminance level transformation unit that receives luminance and chrominance signals, reduces the level of the luminance signal in response to a first control signal, and outputs the chrominance signals and the luminance signal whose level has been reduced; an image converting circuit that receives the output signals from the first luminance level transformation unit and converts the received signals into RGB video signals; and a second luminance level transformation circuit that receives the RGB video signals from the image converting circuit, concurrently increases the respective levels of the RGB video signals in response to a second control signal, and outputs the RGB video signals whose levels have been increased. Here, the display device may be a color display tube ("CDT"), a thin film transistor-liquid crystal display ("TFT-LCD"), or a plasma display panel ("PDP").

Alternatively, the apparatus may include: a first image converting circuit that converts incoming RGB video signals into luminance and chrominance signals; a maximum value output circuit that receives the RGB video signals, compares the levels of the RGB signals with each other, and outputs one of the red, green, and blue signals having a maximum level; a first luminance level transformation unit that receives the luminance and chrominance signals, reduces the level of the luminance signal in response to a first control signal, and outputs the chrominance signals and the luminance signal whose level has been reduced; a second image converting circuit that receives the output signals from the first luminance level transformation circuit and converts the received signals into RGB video signals; and a second luminance level transformation circuit that receives the RGB video signals from the second image converting circuit, concurrently increases the levels of the respective RGB video signals in response to the output signals of the maximum value output circuit and a second control signal, and outputs the RGB video signals whose levels have been increased.

An apparatus for enhancing the contrast and brightness of a video signal displayed on a display device according to the present invention may include a first luminance level transformation circuit that receives luminance and chrominance signals, reduces the level of the luminance signal using statistical characteristics of the chrominance signals, and outputs the result; a hue control circuit that receives the output signals from the first luminance level transformation circuit, rotates and transforms the chrominance signals in response to a control signal, and outputs the result; an image converting circuit that receives the output signals from the hue control circuit and converts the received signals into RGB video signals; and a second luminance level transformation circuit that receives the RGB video signals from the image converting circuit, increases the respective levels of the RGB video signals using a statistical characteristic of the luminance signal. Here, the display device may be a CDT, TFT-LCD, or PDP. The statistical characteristics of the chrominance signals refer to average values of the chrominance signals, while the statistical characteristic of the luminance signal refer to an average value of the luminance signal.

The apparatus may be comprised of a first image converting circuit that converts incoming RGB video signals into luminance and chrominance signals; a maximum value output circuit that receives the RGB video signals, compares the levels of the RGB signals with each other, and outputs one of the red, green, and blue signals having a maximum level; a first luminance level transformation circuit that receives the luminance and chrominance signals, reduces the level of the luminance signal using statistical characteristics of the chrominance signals, and outputs the result; a hue control circuit that receives the output signals from the first luminance level transformation circuit, rotates and transforms the chrominance signals in response to a control signal, and outputs the result; a second image converting circuit that receives the output signals from the hue control circuit and converts the received signals into RGB video signals; and a second luminance level transformation circuit that increases the respective levels of the RGB video signals using the output signal of the maximum value output circuit and the statistical characteristic of the luminance signal.

According to another aspect of the present invention, there is provided a method for enhancing the contrast and brightness of a video signal displayed on a display device. The method includes the steps of receiving first video signals including luminance and chrominance signals, reducing the level of the luminance signal in response to a first control signal, and outputting second video signals including the luminance signal whose level has been reduced; receiving the second video signals and converting them into RGB video signals; and receiving the RGB video signals, concurrently increasing the levels of the respective RGB video signals in response to a second control signal, and outputting RGB video signals whose levels have been increased.

Here, the first and second control signals are generated from statistical characteristics of the chrominance signals and luminance signal for the current frame, respectively. The statistical characteristics may be minimum values, mean values, maximum values, or a histogram.

Alternatively, the first control signal may be generated from a weighted average of average values of the chrominance signals for the previous and current frames.

A method of enhancing the contrast and brightness of a video signal displayed on a display device according to this invention may include the steps of (a) converting incoming RGB video signals into luminance and chrominance signals; (b) receiving the RGB video signals, comparing the levels of the RGB signals with each other, and outputting one of the red, green, and blue signals having a maximum level; (c) receiving the luminance and chrominance signals, reducing the level of the luminance signal in response to a first control signal, and outputting the luminance signal whose level has been reduced and the chrominance signals; (d) receiving the luminance signal whose level has been reduced and the chrominance signals output in the step (c) and converting the received signals into RGB video signals; and (e) receiving the RGB video signals output in the step (d), concurrently increasing the respective levels of the RGB video signals in response to the output signals produced in the step (b) and a second control signal, and outputting the RGB video signals whose levels have been increased.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF PREFERRED EMBODIMENTS

Figure 1:
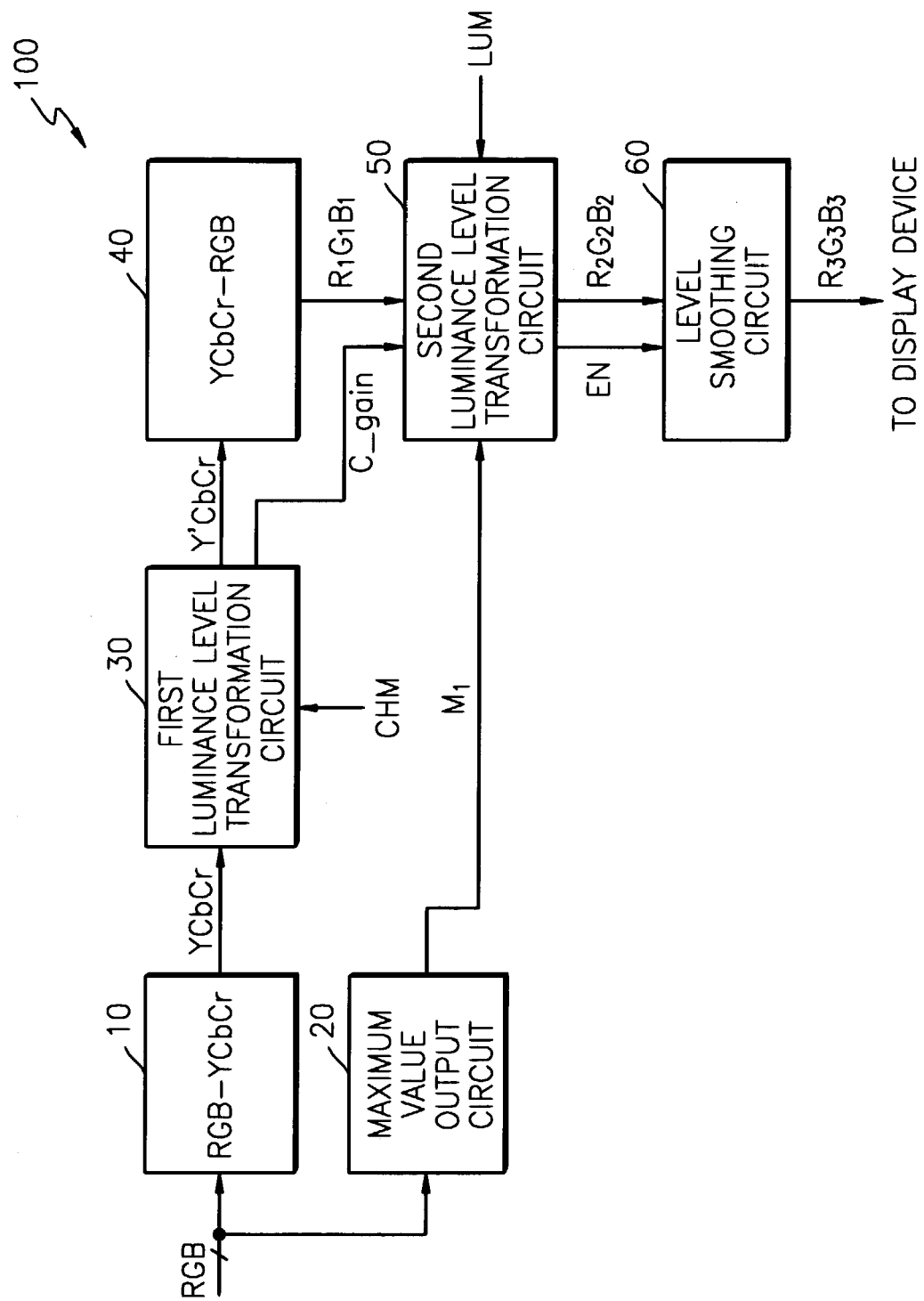
FIG. 1 shows a block diagram of a contrast and brightness enhancement apparatus according to a first embodiment of the present invention.

Embodiments of the present invention will now be described with reference to the accompanying drawings, in which preferred embodiments of the invention are shown. The same reference numerals in different drawings represent the same element.

Referring to FIG. 1, a contrast and brightness enhancement apparatus 100 according to a first embodiment of the present invention includes a first image converting circuit 10, a maximum value output circuit 20, a first luminance level transformation circuit 30, a second image converting circuit 40, a second luminance level transformation circuit 50, and a level smoothing circuit 60.

The first image converting circuit 10 receives incoming RGB video signals (RGB), converts the RGB signals to a YCbCr color space, and outputs digital luminance Y and chrominance information to the first luminance level transformation circuit 30. The chrominance information contains two color-difference components Cb and Cr. Cb represents the difference between a blue signal and a reference signal, and Cr represents the difference between a red signal and the reference signal. Thus, the first image converting circuit 10 converts the 8-bit RGB data to 8-bit YCbCr data. The maximum value output circuit 20 receives incoming RGB video signals (RGB), compares the levels of RGB video signals with each other, and outputs a signal M1 having a maximum level among the RGB video signals (RGB) to the second luminance level transformation circuit 50. In the case of the maximum value output circuit 20 having first and second comparators, the first comparator receives blue B and green G video signals, compares the levels of those signals with each other, and outputs the comparison result. The second comparator receives the output signal from the first comparator and a red R video signal, compares the levels of those signals with each other, and outputs the comparison result. Thus, the output signal M1 of the second comparator is a video signal having the maximum level among the R, G, and B video signals.

The first luminance level transformation circuit 30 receives the output signals YCbCr from the first image converting circuit 10, reduces only the level of luminance information Y (or luminance signal) in response to a first control signal CHM using functions shown in FIGS. 2 and 3 and Equation (1) below, and outputs the result Y'CbCr to the second image converting circuit 40. That is, the first luminance level transformation circuit 30 reduces only the level of luminance signal Y by a predetermined gain C_gain.

Figure 2:
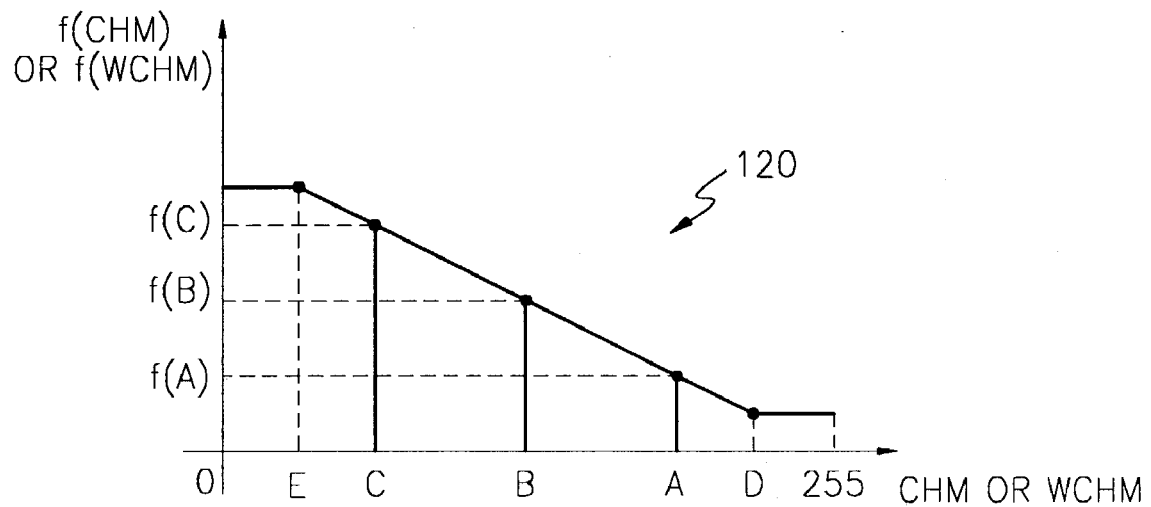
FIG. 2 shows a graphical plot of an exemplary intermediate function used in a first luminance level transformation circuit according to the present invention.

FIG. 2 shows an example of an intermediate function f(CHM) or f(WCHM) used in the first luminance level transformation circuit 30 according to this invention, and indicated generally by the reference numeral 120. The slope of the intermediate function f(CHM) or f(WCHM), or the value D or E shown in FIG. 2 may vary depending upon the manufacturer of the contrast and brightness enhancement apparatus 100. An input value CHM or WCHM may be set in the range from 0 to 255.

Figure 3:
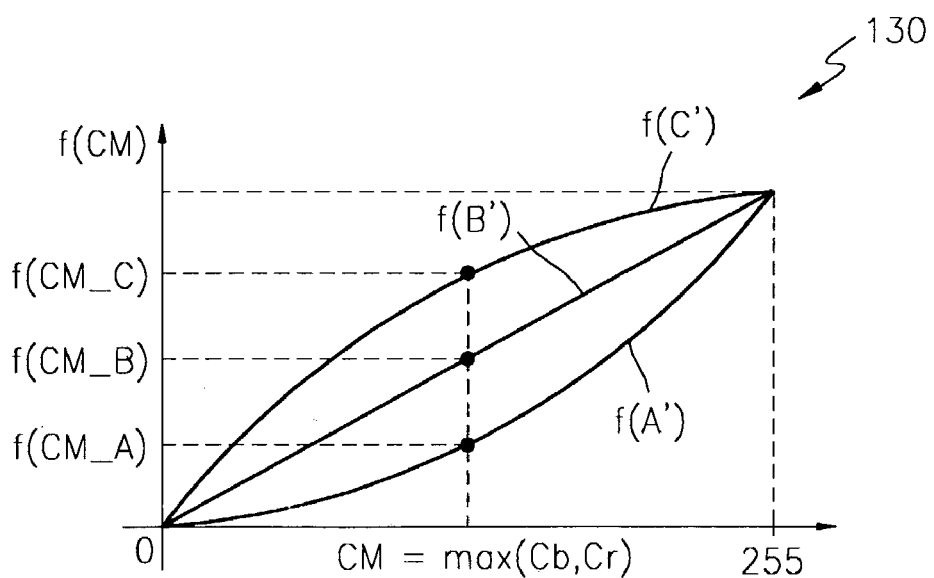
FIG. 3 shows a graphical plot of an exemplary luminance level transform function used in a first luminance level transformation circuit according to the present invention.

FIG. 3 shows an example of a luminance level transform function f(CM) used in the first luminance level transformation circuit 30 according to this invention, and indicated generally by the reference numeral 130. The functions f(A'), f(B'), and f(C') each correspond to f(A), f(B), and f(C) of FIG. 2. An input value CM may be a value from 0 to 255.

Referring to FIGS. 2 and 3, if the first control signal CHM has values A, B, and C, the luminance level transform functions are f(A'), f(B'), and f(C'), respectively. The functions f(A'), f(B') and f(C'), each corresponding to values A, B, C of the first control signal CHM, may be predefined by a manufacturer or user of the contrast and brightness enhancement apparatus 100.

Thus, the first luminance level transformation circuit 30 reduces the input luminance signal Y through Equation (1) using the functions shown in FIGS. 2 and 3 and outputs the result Y'CbCr to the second converting circuit 40. Also, the first luminance level transformation circuit 30 outputs the gain calculated through Equation (1) to the second luminance level transformation circuit 50.

$$C\_gain = f(CM)/CM$$

$$Y' = Y/C\_gain \quad (1)$$

where CM denotes the maximum value of two color-difference components (or signals) Cb and Cr and f(CM) is the output value of CM. Y and Y' denote input and output signals of the first luminance level transformation circuit 30, respectively.

To prevent the luminance signal Y from exceeding the color gamut when converting the luminance level, the first luminance level transformation circuit 30 reduces the level of the luminance signal Y. The reduction in the level of the luminance signal Y is compensated for by the second luminance level transformation circuit 50.

Referring to FIGS. 2 and 3, as the first control signal CHM increases, the gain C_gain decreases. For example, assuming the value of the first control signal CHM is A and the maximum value of the two color-difference signals Cb and Cr is CM, the first luminance level transformation circuit 30 calculates gain C_gain (=f(CM_A/CM)) using the function f(A') and reduces the level of the luminance signal Y using the gain. The second image converting circuit 40 then receives the output signals Y'CbCr from the first luminance level transformation circuit 30, converts them into RGB video signals, and outputs the result $R_1G_1B_1$ to the second luminance level transformation circuit 50. The second luminance level transformation circuit 50 receives the output signal $M_1$ of the maximum value output circuit 20, the gain C_gain from the first luminance level transformation circuit 30, the video signals $R_1G_1B_1$ from the second image converting circuit 40, and a second control signal LUM, increases gains of the video signals $R_1G_1B_1$ using Equations (2) and (3) below, and outputs the result $R_2G_2B_2$ to the level smoothing circuit 60. The second luminance level transformation circuit 50 generates an enable signal EN for enabling the level smoothing circuit 60 and outputs it to the level smoothing circuit 60.

$$Gain = f(M_1)/M_1$$

$$Y\_gain = Min\{(Gain \times C\_gain), 255/Max(R_1, G_1, B_1)\} \quad (2)$$

Figure 4:
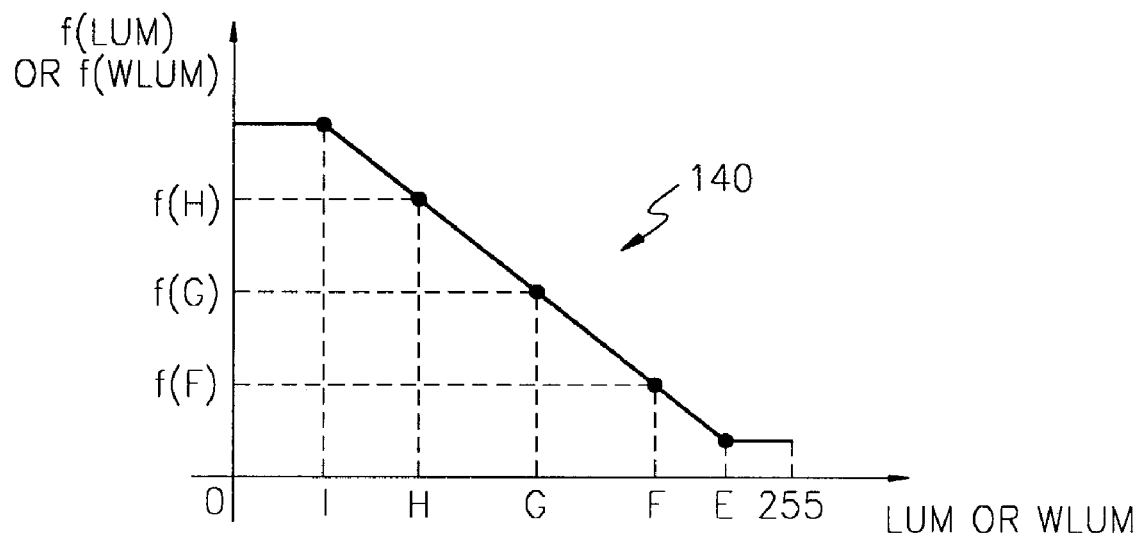
FIG. 4 shows a graphical plot of an exemplary intermediate function used in a second luminance level transformation circuit according to the present invention.

FIG. 4 shows an example of an intermediate function f(LUM) or f(WLUM) used in the second luminance level transformation circuit 50 according to this invention, and indicated generally by the reference numeral 140. The slope of the intermediate function f(LUM) or f(WLUM), or a value E or I shown in FIG. 4 may vary depending upon a user or a manufacturer of the contrast and brightness enhancement apparatus 100.

Figure 5:
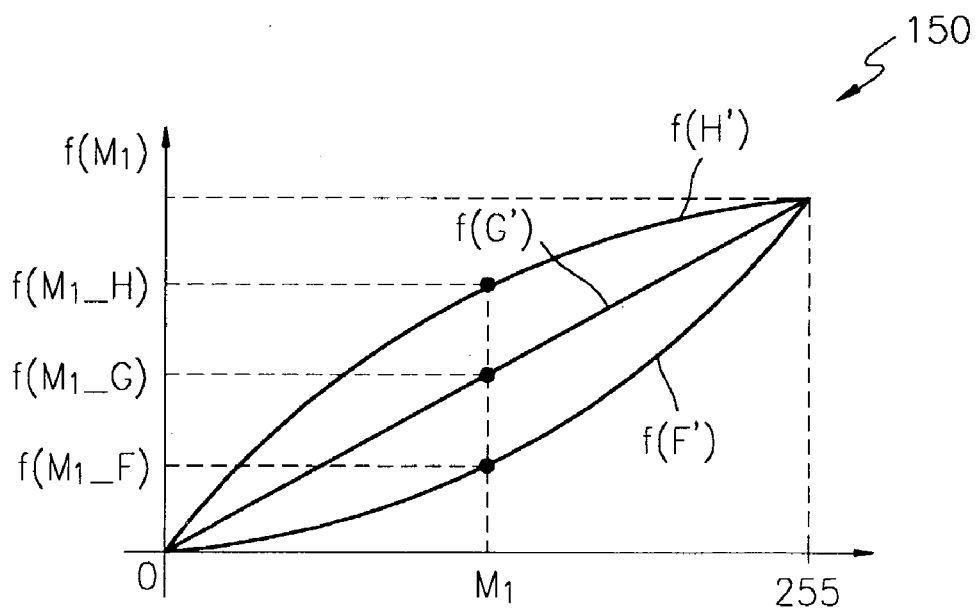
FIG. 5 shows a graphical plot of an exemplary luminance level transform function used in a second luminance level transformation circuit according to the present invention.

FIG. 5 shows an example of a luminance level transform function $f(M_1)$ used in the second luminance level transformation circuit 50 according to this invention, and indicated generally by the reference numeral 150. The functions f(F'), f(G'), and f(H') shown in FIG. 5 each correspond to f(F), f(G), and f(H) of FIG. 4. The functions f(F'), f(G'), and f(H') may be preset by a user or by a manufacturer of the contrast and brightness enhancement apparatus 100.

Referring to FIGS. 4 and 5, the larger the value of the second control signal LUM, the smaller the gain obtained by Equation (2).

To ensure preservation of color, the second luminance level transformation circuit 50 calculates the smaller gain Y_gain of Gain×C_gain and $255/Max(R_1, G_1, B_1)$, increases the gains of $R_1G_1B_1$ video signals, and outputs the result $R_2G_2B_2$ to the level smoothing circuit 60.

$$R_2 = Y\_gain \times R_1$$

$$G_2 = Y\_gain \times G_1$$

$$B_2 = Y\_gain \times B_1 \quad (3)$$

The level smoothing circuit 60 filters out the output signals $R_2G_2B_2$ of the second luminance level transformation circuit 50 on a pixel-by-pixel basis in response to the enable signal EN and outputs the result $R_3G_3B_3$ to a display device such as a color display tube (CDT), a thin film transistor liquid crystal display (TFT-LCD), or a plasma display panel (PDP).

The level smoothing circuit 60 filters out the previous and current pixel values using a weighted value. Thus, if the enable signal EN is activated or if levels of the output signals $R_2G_2B_2$ of the second luminance level transformation circuit 50 are expanded, the level smoothing circuit 60 selectively performs smoothing on an interval at which the luminance level is expanded.

That is, to suppress noise amplification at the interval the level of the luminance signal is expanded when converting the level of the luminance signal, low pass filtering is selectively performed on the region where the level is expanded. By doing so, the level smoothing circuit 60 prevents abrupt changes in the output signals $R_2G_2B_2$ of the second luminance level transformation circuit 50.

Alternatively, the contrast and brightness enhancement apparatus 100 may include the first image converting circuit 10, the first luminance level transformation circuit 30, the second image converting circuit 40, the second luminance level transformation circuit 50, and the level smoothing circuit 60. The operation and function of the respective circuits 10, 30, 40, 50, and 60 are substantially the same as those of the circuits 10, 30, 40, 50, and 60 mentioned above.

Figure 6:
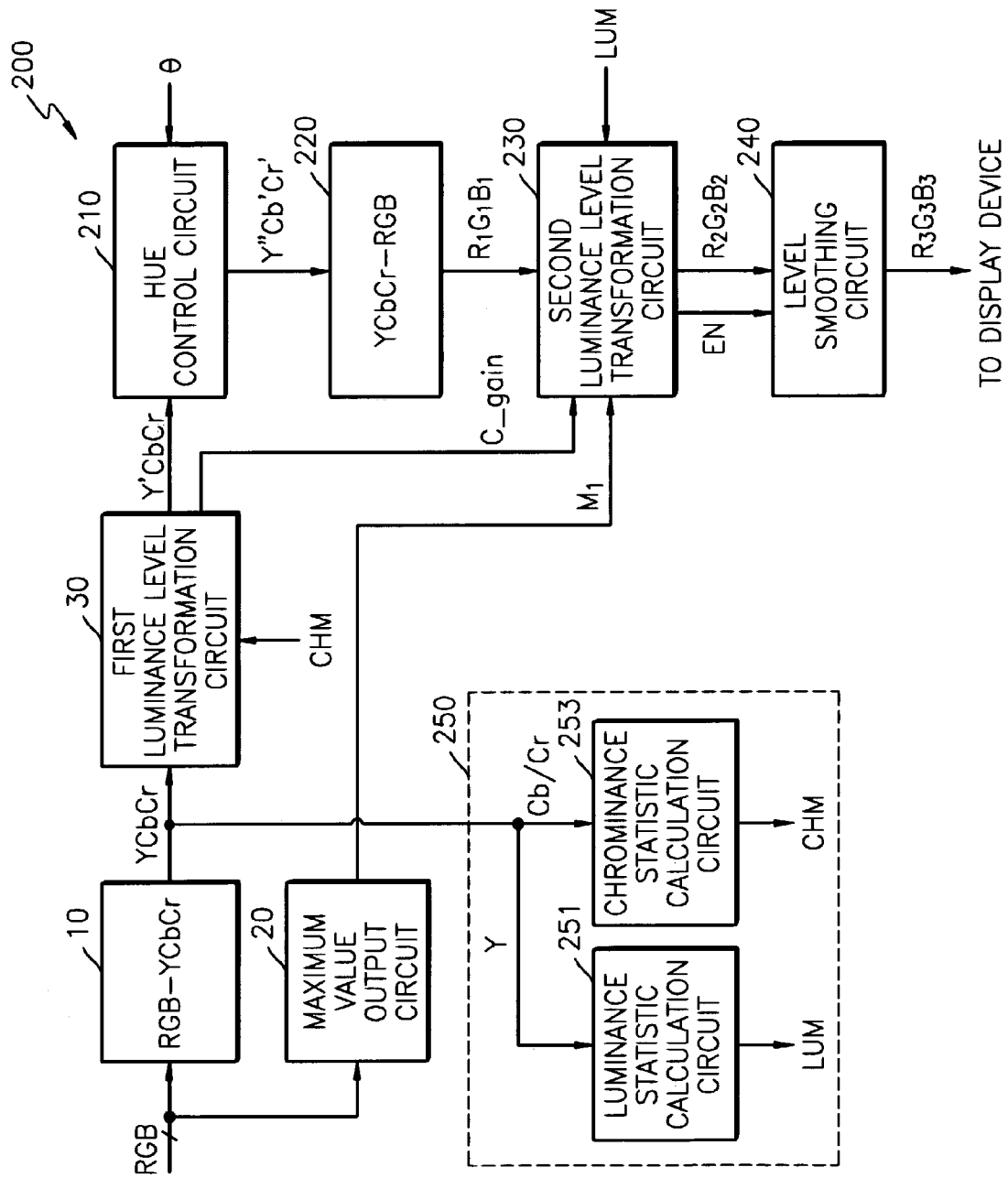
FIG. 6 shows a block diagram of a contrast and brightness enhancement apparatus according to a second embodiment of the present invention.

FIG. 6 is a block diagram of a contrast and brightness enhancement apparatus 200 according to a second embodiment of the present invention. Referring to FIG. 6, the contrast and brightness enhancement apparatus 200 is comprised of a first image converting circuit 10, a maximum value output circuit 20, an image statistic estimation circuit 250, a first luminance level transformation circuit 30, a hue control circuit 210, a second image converting circuit 220, a second luminance level transformation circuit 230, and a level smoothing circuit 240.

The first image converting circuit 10 receives incoming RGB video signals and converts the RGB signals to a YCbCr color space, and outputs digital luminance information (or signal) Y and chrominance information (or signal) to the image statistic estimation circuit 250 and the first luminance level transformation circuit 30. The chrominance information or signal contains two color-difference components (or signals) Cb and Cr. Cb represents the difference between a blue signal and a reference signal, and Cr represents the difference between a red signal and a reference signal. The maximum value output circuit 20 has the same configuration and function as the corresponding element 20 of FIG. 1, and thus a detailed description will be omitted.

The image statistic estimation circuit 250 includes a luminance statistic calculation circuit 251 and a chrominance statistic calculation circuit 253. The luminance statistic calculation circuit 251 receives only luminance information Y among the output signals YCbCr from the first image converting circuit 10, calculates an average value of the luminance information Y for the current frame, and outputs the result LUM to the second luminance level transformation circuit 230. For example, if the luminance information Y is represented by 8 bits, the luminance statistic circulation circuit 251 outputs one of 256 levels as the level LUM. The chrominance statistic calculation circuit 253 receives chrominance information Cb and Cr among the output signals YCbCr from the first image converting circuit 10, calculates an average value of chrominance information for the current frame, and outputs the result CHM to the first luminance level transformation circuit 30. For example, if the chrominance information Cb and Cr is represented by 8 bits, the chrominance statistic calculation circuit 253 outputs one of 256 levels as the level CHM. Here, the chrominance statistic calculation circuit 253 may calculate the mean Mean(Max(Cb, Cr)) of maximum values of the two color-difference signals Cb and Cr or the maximum Max(Max(Cb, Cr)) of the two color difference signals Cb and Cr and output the result.

The first luminance level transformation circuit 30 receives the output signals YCbCr from the first image converting circuit 10, reduces only the level of luminance information Y (or luminance signal) in response to the output signal CHM from the chrominance statistic calculation circuit 253 using functions shown in FIGS. 2 and 3 and Equation (1) above, and outputs the result Y'CbCr to the hue control circuit 210. In addition, the first luminance level transformation circuit 30 outputs the gain C_gain calculated using Equation (1) to the second luminance level transformation circuit 230.

Here, the principle used to reduce the level of luminance information Y in the first luminance level transformation circuit 30 is the same as the principle used in the luminance level transformation circuit 30 of FIG. 1. Thus, similarly, the first luminance level transformation circuit 30 can reduce the level of luminance information Y using the functions illustrated in FIGS. 2 and 3.

To prevent the luminance signal Y from exceeding the color gamut during its conversion, the first luminance level transformation circuit 30 reduces the level of the luminance signal Y. The reduction in the level of the luminance signal Y is compensated for by the second luminance level transformation circuit 230.

The hue control circuit 210 receives the output signals Y'CbCr from the first luminance level transformation circuit 30, rotates and transforms the two color-difference components Cb and Cr in response to a control signal $\theta$ using Equation (4), and outputs the result Y"Cb'Cr' to the second image converting circuit 220. The control signal $\theta$ is input from the outside.

For example, the control signal $\theta$ may be input through an On Screen Display. The control signal $\theta$ is a variable for rotating the coordinates of the two color-difference signals Cb and Cr by a predetermined angle. The control signal $\theta$ may be set to a predetermined angle, $\cos\theta$, and $\sin\theta$. The hue control circuit 210 may include a look-up table corresponding to the control signal $\theta$.

$$Y''=0.5 \times Y'$$

$$Cb'=0.5 \times (\cos\theta \times Cb + \sin\theta \times Cr)$$

$$Cr'=0.5 \times (-\sin\theta \times Cb + \cos\theta \times Cr) \quad (4)$$

The hue control circuit 210 reduces the levels of the luminance signal Y' and two color-difference signals Cb and Cr using Equation (4) to prevent them from exceeding the color gamut. A scaling factor (0.5) used in Equation (4) may vary.

The second image converting circuit 220 receives the output signals Y"Cb'Cr' from the hue control circuit 210, converts them to RGB video signals, and outputs the result $R_1G_1B_1$ to the second luminance level transformation circuit 230.

The second luminance level transformation circuit 230 receives the output signal $M_1$ from the maximum value output circuit 20, the gain C_gain from the first luminance level transformation circuit 30, the video signals $R_1G_1B_1$ from the second image converting circuit 220, and the signal LUM from the luminance statistic calculation circuit 251, increases the respective gains of video signals $R_1G_1B_1$ using Equation (3) and Equation (5) below, and outputs the result $R_2G_2B_2$ to the level smoothing circuit 240.

Further, the second luminance level transformation circuit 230 generates an enable signal EN for enabling the level smoothing circuit 240 and outputs it to the level smoothing circuit 240.

$$Gain = F(M_1)/M_1,$$

$$Y\_gain = \mathrm{Min}((Gain \times C\_Gain \times 2), 255/(\mathrm{Max}(R_1, G_1, B_1))) \quad (5)$$

The principle used to calculate the gain in the second luminance level transformation circuit 230 substantially coincides with the principle used to calculate gain in the second luminance level transformation circuit 50 of FIG. 1. Therefore, similarly to the transformation circuit 50 of FIG. 1, the second luminance level transformation circuit 230 can calculate the gain for the output signal $M_1$ of the maximum value output circuit 30 using the intermediate function illustrated in FIG. 4 and the respective luminance level transform functions f(F'), f(G') and f(H') illustrated in FIG. 5.

The second luminance level transformation circuit 230 outputs a gain Y_gain which is the minimum one of Gain× C_Gain×2 and $255/(\mathrm{Max}(R_1, G_1, B_1))$ to ensure preservation of color. Further, the second luminance level transformation circuit 230 multiplies a scaling factor, i.e., gain C_Gain×2, by Gain to compensate for reduction in gain by the first luminance level transformation circuit 30 and the hue control circuit 210.

The configuration and function of the level smoothing circuit 240 are the same as those of the counterpart 60 of FIG. 1, and thus a detailed description will be omitted.

The contrast and brightness enhancement apparatus 200 of FIG. 6 is capable of adaptively controlling the luminance signal Y and color-difference signals Cb and Cr using statistical characteristics such as the mean value, minimum value, maximum value, and histogram of video signals (or images) input in units of frames. The apparatus 200 according to this invention can adaptively control the contrast and brightness of still images displayed on the entire screen of a display or a part thereof. Therefore, the apparatus 200 can control the contrast of an input pixel using non-linear functions shown in FIGS. 3 and 5 while suppressing changes in saturation that may occur when controlling the contrast.

Figure 7:
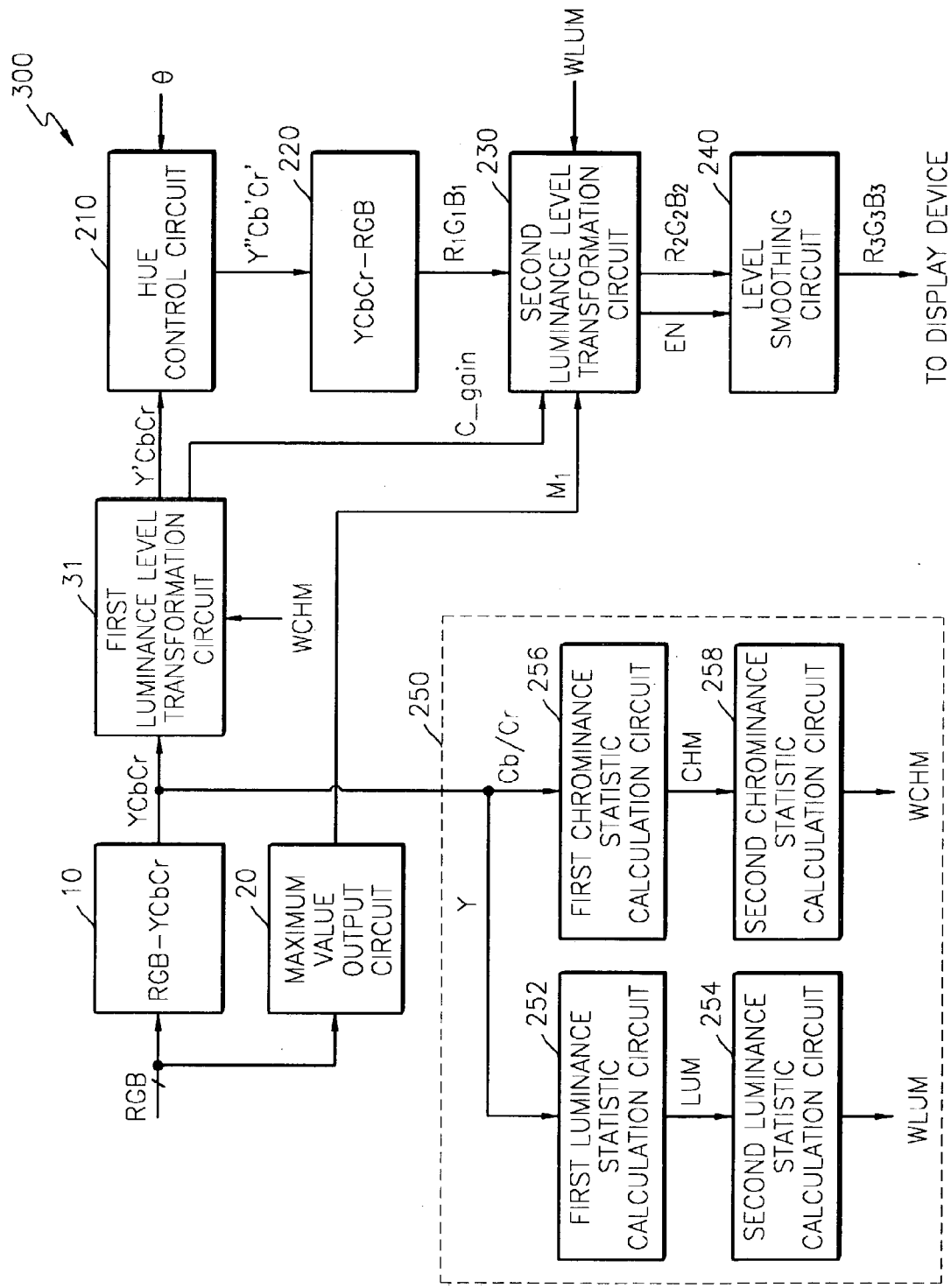
FIG. 7 shows a block diagram of a contrast and brightness enhancement apparatus according to a third embodiment of the present invention.

FIG. 7 is a block diagram of a contrast and brightness enhancement apparatus 300 according to a third embodiment of this invention. Referring to FIG. 7, the contrast and brightness enhancement apparatus 300 includes a first image converting circuit 10, a maximum value output circuit 20, an image statistic estimation circuit 250, a first luminance level transformation circuit 31, a hue control circuit 210, a second image converting circuit 220, a second luminance level transformation circuit 230, and a level smoothing circuit 240.

The first image converting circuit 10 receives incoming RGB video signals and converts the RGB signals to a YCbCr color space, and outputs digital luminance information (or signal) Y and chrominance information (or signal) to the image statistic estimation circuit 250 and the first luminance level transformation circuit 31. The configuration and function of the maximum value output circuit 20 are identical to those of the corresponding element 20 of FIG. 1, and thus a detailed description will be omitted.

The image statistic estimation circuit 250 consists of first and second luminance statistic calculation circuits 252 and 254 and first and second chrominance statistic calculation circuits 256 and 258. The first luminance statistic calculation circuit 252 receives only luminance information Y among the output signals YCbCr of the first image converting circuit 10, calculates the statistical characteristic (e.g., average value) of luminance information Y for the current frame, and outputs the result LUM to the second luminance statistic calculation circuit 254. The second luminance statistical calculation circuit 254 then calculates a weighted average (or mean) of the statistic characteristics (e.g., average values) of luminance information Y for the previous and current frames, and outputs the result WLUM to the second luminance level transformation circuit 231. Using a weighted average is aimed at suppressing rapid variations in the statistical characteristics of luminance information Y for the current frame. Thus, the second luminance statistical calculation circuit 254 may cumulatively calculate the statistic characteristics (average values) of luminance information Y for all frames.

The weighted average used in the second luminance statistic calculation circuit 254 may be calculated using Equation (6) below:

$$\text{Weighted average} = (1-w) \times M\_cf + w \times M\_pf \qquad (6)$$

where w, M_cf, and M_pf denote a weight, the mean of luminance information Y for the current frame, and the mean of luminance information Y for the previous frame, respectively. Here, w is greater than or equal to 0 but less than 1.

The first and second luminance statistic calculation circuits 252 and 254 can calculate any or all of statistical characteristics including minimum value, mean value, maximum value or histogram of the luminance information Y.

The first chrominance statistic calculation circuit 256 receives chrominance information Cb and Cr among the output signals YCbCr from the first image converting circuit 10, calculates the statistical characteristic (e.g., average value) of chrominance information for the current frame, and outputs the result CHM to the second chrominance statistic calculation circuit 258. Here, the first chrominance statistic calculation circuit 256 may calculate the mean Mean(Max(Cb, Cr)) of maximum values of the two color-difference signals Cb and Cr or the maximum Max(Max(Cb, Cr)) of the two color-difference signals Cb and Cr to output the result.

The second chrominance statistic calculation circuit 258 calculates a weighted average (or mean) of the statistical characteristics (e.g., average values) of chrominance information for the previous and current frames, and outputs the result WCHM to the first luminance level transformation circuit 31. Thus, the second chrominance statistic calculation circuit 258 may cumulatively calculate the statistical characteristics (average values) of chrominance information for all frames.

The weighted average used in the second chrominance statistic calculation circuit 258 may be calculated using Equation (6) above. In this case, M_cf and M_pf denote the means of chrominance information Y for the current and previous frames, respectively.

For example, while the first and second chrominance statistic calculation circuits 256 and 258 may each calculate the means of maximum values of the two color-difference signals Cb and Cr while the second chrominance statistic calculation circuit 258 may cumulatively calculate the mean of larger values of the two color-difference components for all frames.

The function of the first luminance level transformation unit 31 is substantially the same as that of its counterpart 30 of FIG. 6. The first luminance level transformation unit 31 receives the output signals YCbCr from the first image converting circuit 10, reduces only the level of luminance information Y in response to the output signal WCHM from the second chrominance statistic calculation circuit 258 using functions shown in FIGS. 2 and 3 and Equation (1) above, and outputs the result Y'CbCr to the hue control circuit 210.

The operation and function of hue control circuit 210 are identical to those of the same element 210 of FIG. 6. Specifically, the hue control circuit 210 receives the output signals Y'CbCr from the first luminance level transformation circuit 31, rotates and transforms the two color-difference components Cb and Cr in response to a control signal θ using Equation (4) above, and outputs the result Y"Cb'Cr' to the second image converting circuit 220. The second image converting circuit 220 receives the output signals Y"Cb'Cr' from the hue control circuit 210, converts them to RGB video signals, and outputs the result $R_1G_1B_1$ to the second luminance level transformation circuit 231. That is, the second image converting circuit 220 converts YCbCr data into RGB signals.

The function and operation of the second luminance level transformation circuit 230 are substantially the same as those of its counterpart 230 of FIG. 6. That is, the second luminance level transformation circuit 230 receives the output signal $M_1$ from the maximum value output circuit 20, the gain C_gain from the first luminance level transformation circuit 31, the video signals $R_1G_1B_1$ from the second image converting circuit 220, and the signal WLUM from the second luminance statistic calculation circuit 254, increases the gains of video signals R1G1B1 using Equations (3) and (5), and outputs the result $R_2G_2B_2$ to the level smoothing circuit 240.

The level smoothing circuit 240 filters out the output signals R2G2B2 of the second luminance level transformation circuit 231 on a pixel-by-pixel basis in response to an enable signal EN and outputs the result R3G3B3 to a display device such as a color display tube (CDT), a thin film transistor liquid crystal display (TFT-LCD), or a plasma display panel (PDP). The level smoothing circuit 240 has the same configuration as the corresponding element 240 of FIG. 6.

The contrast and brightness enhancement apparatus 300 of FIG. 7 is capable of adaptively controlling the luminance signal Y and/or color-difference signals Cb and Cr using statistical characteristics such as the mean value, minimum value, maximum value, and histogram of video images input in units of frames. The apparatus 300 according to this invention can adaptively control the contrast and brightness of moving images displayed on the entire screen of a display or a part thereof.

An adaptive contrast and brightness enhancement method for preserving the color of an image in accordance with the present disclosure may be better understood by reference to FIGS. 1 and 4. The contrast and brightness enhancement apparatus according to the embodiments of this invention may be implemented in a single chip or a system on chip design.

As described above, an adaptive contrast and brightness enhancement method and apparatus for preserving the color of a video image facilitates contrast enhancement depending on the level of an incoming video image while suppressing color variations that may occur when expanding the contrast.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

For example, the present invention may be embodied as a computer readable code in a computer readable medium. Here, the computer readable medium may be any recording apparatus capable of storing data that can be read by a computer system, e.g., a read-only memory ("ROM"), a random access memory ("RAM"), a compact disc read-only memory ("CD-ROM"), a magnetic tape, a floppy disk, an optical data storage device, and the like. In addition, the computer readable medium may be a carrier wave that transmits data via the Internet, for example. The computer readable recording medium can be dispersively installed in a computer system connected to a network, and stored and accomplished as a computer readable code by a distributed computing environment.

Further, the teachings of the present disclosure are preferably implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. An apparatus for enhancing the contrast and brightness of a video signal displayed on a display device, the apparatus comprising:
   a first luminance level transformation circuit that receives luminance and chrominance signals, reduces the level of the luminance signal using statistical characteristics of the chrominance signals, and outputs a luminance result;
   a hue control circuit that receives the output signals from the first luminance level transformation circuit, rotates and transforms the chrominance signals in response to a control signal, and outputs a chrominance result;
   an image converting circuit that receives the output signals from the hue control circuit and converts the received signals into RGB video signals; and
   a second luminance level transformation circuit that receives the RGB video signals from the image converting circuit and increases the respective levels of the RGB video signals using statistical characteristics of the luminance signal.

2. The apparatus of claim 1, wherein the display device is a color display tube ("CDT"), a thin film transistor liquid crystal display ("TFT-LCD"), or a plasma display panel ("PDP").

3. The apparatus of claim 1, wherein the chrominance signals are two color-difference signals Cb and Cr.

4. The apparatus of claim 1, wherein the statistical characteristics of the chrominance signals are average values of the chrominance signals.

5. The apparatus of claim 1, wherein the statistical characteristics of the luminance signal are an average value of the luminance signal.

6. An apparatus for enhancing the contrast and brightness of a video signal displayed on a display device, the apparatus comprising:
   a first image converting circuit that converts incoming RGB video signals into luminance and chrominance signals;
   a maximum value output circuit that receives the RGB video signals, compares the levels of the RGB signals with each other, and outputs one of the red, green, and blue signals having a maximum level;
   a first luminance level transformation circuit that receives the luminance and chrominance signals, reduces the level of the luminance signal using statistical characteristics of the chrominance signals, and outputs a luminance result;
   a hue control circuit that receives the output signals from the first luminance level transformation circuit, rotates and transforms the chrominance signals in response to a control signal, and outputs a chrominance result;
   a second image converting circuit receives the output signals from the hue control circuit and converts the received signals into RGB video signals; and
   a second luminance level transformation circuit that increases the respective levels of the RGB video signals using the output signal of the maximum value output circuit and statistical characteristic of the luminance signal.

7. The apparatus of claim 6, wherein the statistical characteristics of the chrominance signals are average values of the chrominance signals for the current frame.

8. The apparatus of claim 6, wherein the statistical characteristics of the luminance signal are an average value of the luminance signal for the current frame.

9. The apparatus of claim 6, wherein the statistical characteristics of the chrominance signals are a weighted average of average values of the chrominance signals for the previous and current frames.

10. The apparatus of claim 6, wherein the statistical characteristics of the luminance signal are a weighted average of average values of the luminance signals for the previous and current frames.

11. The apparatus of claim 6, wherein the statistical characteristics of the chrominance signals are a cumulative weighted average calculated for all frames, and the weighted average is represented by the following Equation:

weighted average=$(1-w) \times M\_cf + w \times M\_pf$ where w, M_cf and M_pf denote a weight, mean of the chrominance signals for the current frame, and mean of the chrominance signals for the previous frame, respectively, and w is greater than or equal to 0 but less than 1.

12. The apparatus of claim 6, wherein the statistical characteristics of the luminance signal are a cumulative weighted average calculated for the chrominance signals covering all frames, and the weighted average is represented by the following Equation:

weighted average=$(1-w) \times M\_cf + w \times M\_pf$ where w, M_cf and M_pf denote a weight, the mean of the luminance signal for the current frame, and the mean of the luminance signal for the previous frame, respectively, and w is greater than or equal to 0 but less than 1.

13. The apparatus of claim 6, wherein the hue control circuit reduces the levels of the output signals from the first luminance level transformation circuit to prevent them from exceeding the color gamut when rotating and transforming the chrominance signals, and outputs the chrominance result.

14. An apparatus for enhancing the contrast and brightness of a video signal displayed on a display device, the apparatus comprising:

a first image converting circuit that converts incoming RGB video signals into luminance and chrominance signals;

a maximum value output circuit that receives the RGB video signals, compares the levels of the RGB signals with each other, and outputs the one of the red, green, and blue signals having the maximum level;

a signal statistic estimation circuit that receives each of the luminance and chrominance signals respectively, calculates statistical characteristics of the received signals respectively, and outputs first and second parameters;

a first luminance level transformation circuit that receives the luminance and chrominance signals, reduces the level of the luminance signal in response to the first parameter, and outputs a luminance result;

a hue control circuit that receives the output signals from the first luminance level transformation circuit, rotates and transforms the chrominance signals in response to a control signal, and outputs a chrominance result;

a second image converting circuit that receives the output signals from the hue control circuit, converts the received signals into RGB video signals, and outputs an RGB result; and a second luminance level transformation circuit that increases the respective gains of the RGB video signals output from the second image converting circuit in response to the second parameter, and output signal output from the maximum value output circuit and RGB video signals output from the second image converting circuit.

15. The apparatus of claim 14, wherein the first parameter is an average value of the chrominance signals for the current frame.

16. The apparatus of claim 14, wherein the second parameter is an average value of the luminance signal for the current frame.

17. The apparatus of claim 14, wherein the first parameter is a weighted average of average values of the chrominance signals for the previous and current frames.

18. The apparatus of claim 14, wherein the second parameter is a weighted average of average values of the luminance signals for the previous and current frames.

* * * * *